United States Patent [19]
Van Sickle

[11] 3,858,931
[45] *Jan. 7, 1975

[54] CLIP DEVICE FOR VEHICLE GLARE SHIELD

[76] Inventor: John Van Sickle, 1841 Billington Rd., East Aurora, N.Y. 14052

[*] Notice: The portion of the term of this patent subsequent to Oct. 10, 1989, has been disclaimed.

[22] Filed: Oct. 3, 1972

[21] Appl. No.: 294,862

Related U.S. Application Data

[63] Continuation-in-part of Ser. No. 875,929, Nov. 12, 1969, Pat. No. 3,697,125.

[52] U.S. Cl............................ 296/97 C, 24/81 B
[51] Int. Cl............................................... B60j 3/00
[58] Field of Search .......... 296/97 R, 97 C; 24/81 B

[56] References Cited
UNITED STATES PATENTS

| | | | |
|---|---|---|---|
| 1,958,934 | 5/1934 | Williams | 160/212 |
| 3,351,375 | 11/1967 | Wheeler | 296/97 C |
| 3,515,427 | 6/1970 | Van Sickle | 296/97 R |
| 3,697,125 | 10/1972 | Van Sickle | 296/97 C |

FOREIGN PATENTS OR APPLICATIONS

| | | | |
|---|---|---|---|
| 434,008 | 10/1967 | Switzerland | 24/81 B |

*Primary Examiner*—Robert J. Spar
*Assistant Examiner*—Leslie J. Paperner

[57] ABSTRACT

A separately constructed clip device for holding a vehicle glare shield having a body of transparent glare reducing sheet material to a vehicle sun visor, vertically disposed, in overlapping relation thereto so as to extend below the bottom edge of the sun visor as a downward extension thereof, such clip device having opposed arms with upper free end portions for gripping the sun visor, a bight portion joining the lower ends of such arms, a transversely extending downwardly facing channel at the lower extremity of one of such arms for holding the upper edge of the glare shield, said bight portion having a minimal downward extent below the bottom edge of the sun visor so as not to create distracting images thereof.

2 Claims, 4 Drawing Figures

PATENTED JAN 7 1975

3,858,931

CLIP DEVICE FOR VEHICLE GLARE SHIELD

This application is a continuation in part of application S.N. 875,929 filed 11/12/69, now U.S. Pat. No. 3,697,125.

BACKGROUND OF THE INVENTION

The invention relates to a vehicle glare shield attachment for reducing the glare encountered in driving and in particular to a clip device for securing a vehicle glare shield comprising a sheet of transparent glare reducing material to a vehicle sun visor, downwardly disposed, in overlapping relation thereto and as a downward extension of the sun visor in a manner which will not produce distracting images of the clip device below the bottom edge of the sun visor.

Under the prior art, as disclosed in applicant's U.S. Pat. No. 3,195,946, the clip for grasping the sun visor is an integral part of the shield and comprises a first arm, which is part of the shield, a connecting member extending outwardly from the body of the shield and a second arm held by the connecting member in opposition to the first arm. The body of the glare shield is mounted against the sun visor, disposed in a vertical position, by fitting the clip over the lower portion of the sun visor so that the connecting member presses snugly against the bottom edge of the sun visor. The connecting member and the portion of the second arm attached thereto create distracting images as seen by either eye of the operator of the vehicle while looking through the shield. Applicant's U.S. Pat. No. 3,515,427 discloses methods of constructing the connecting member and that portion of the second arm attached thereto (together referred to therein as the "abutment member") in a manner to reduce the distraction caused by the separate and spaced images of such abutment member as seen by each eye of the operator while looking through the shield at a distant object ahead. The approach is one of coexisting with the inevitable iamges by controlling their shape and location. In contrast, the present invention provides an improved method of construction which permits a reduction in the vertical extent of the images to the point where they become minimal and unnoticeable. It also provides other advantages, as will be seen below.

The body of the shield is best made of a sheet of transparent glare reducing plastic material. Under the prior art, the connecting member is made of plastic material and may be either cast with the shield or cemented to it. The plastic connecting member, in order to be of sufficient rigidity and strength to withstand the strain concentratd on it by the outward pressure on the arms of the clip while frictionally engaging the sun visor, requires a vertical extent sufficient to cause distraction from the images of the connecting member as seen below the bottom edge of the sun visor by the operator. The present invention, by making possible the use of stronger material in the connecting member makes possible a reduction in the downward protrusion so as to effectively reduce this type of distraction.

The separate construction of the clip device also has the advantage of making possible the use of separately manufactured high quality sheet material for the body of the shield in a method of manufacture suitable for commercial production.

SUMMARY OF THE INVENTION

The present invention involves the combination with a vehicle sun visor, disposed substantially vertically and presenting a transversely extending lower edge, of a glare shield comprising a body of transparent glare reducing material having an upper edge portion for disposition in overlapping relation to the lower edge portion of the sun visor, and a clip device for holding the glare shield in such position, such clip device, preferably made of metal and capable of being extruded, having (1) a pair of opposed arms with upper free end portions engaging and frictionally gripping the body of the sun visor, (2) a bight portion joining the lower ends of said arms presenting an upwardly facing seating surface engaging the lower edge of the sun visor and in conjunction with the gripping action of said arms stabilizing the clip device with relation to the visor, (3) a transversely extending external wall surface adjacent the juncture of said bight with one of said arms, such wall surface overlaping the lower edge portion of the sun visor and being substantially parallel with the body of the sun visor, and (4) a further wall appended to the exterior side of said one arm near its lower extremity extending downwardly parallel with said wall surface and forming a transversely extending downwardly facing channel therewith receiving the upper edge of the glare shield and maintaining it in the aforesaid position with respect to the sun visor, said bight portion having a minimal downward extent below the bottom edge of the sun visor so as to avoid creating distracting images of the clip device below the bottom edge of the sun visor.

DESCRIPTION OF THE PREFERRED EMBODIMENT

Figure 1:
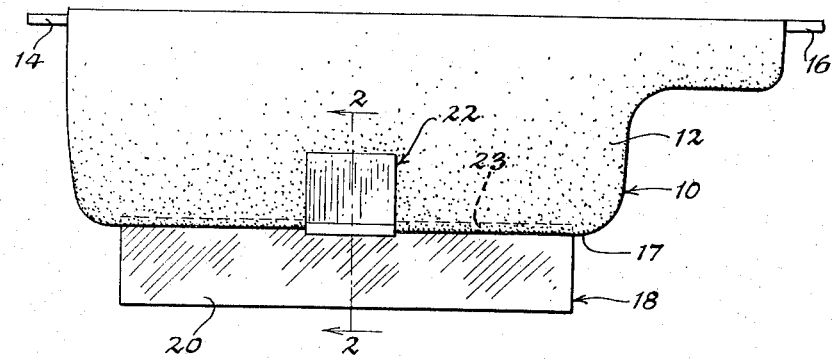
FIG. 1 is an elevational view showing a clip device of the present invention attaching a glare shield to a vehicle sun visor.

Referring now to FIG. 1, the reference numeral 10 indicates in general a vehicle sun visor, such as is standard equipment on automobiles. As is conventional, the main body 12 of the sun visor 10 is provided with mounting members 14 and 16 by means of which the sun visor 10 is pivotally attached to the inside of the vehicle for movement between an out-of-the-way position and a substantially dependent position transverse to the direction of the vehicle. The sun visor 10 has a generally horizontal lower edge 17.

The glare shield attachment is indicated generally by the reference character 18 in FIG. 1, and includes a main body portion 20 consisting of a sheet of glare reducing material, and a clip device 22, in accordance with the present invention. The body portion 20 preferably is rectangular in shape and extends transversely below the visor with its upper marginal edge portion 23 overlapping the lower edge portion of the body 12 of the visor. The clip device 22 permits the shield to be positioned against the lower edge portion of the visor in overlapping relation thereto so as to extend below the bottom edge of the sun visor as a downward extension of the sun visor. The clip device 22 also permits the shield to be positioned laterally on the visor at the most convenient location for the operator.

Figure 2:
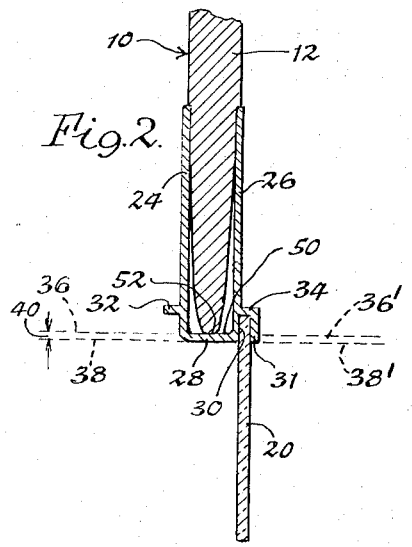
FIG. 2 is an enlarged vertical section taken along the plane of section line 2—2 in FIG. 1.
Figure 4:
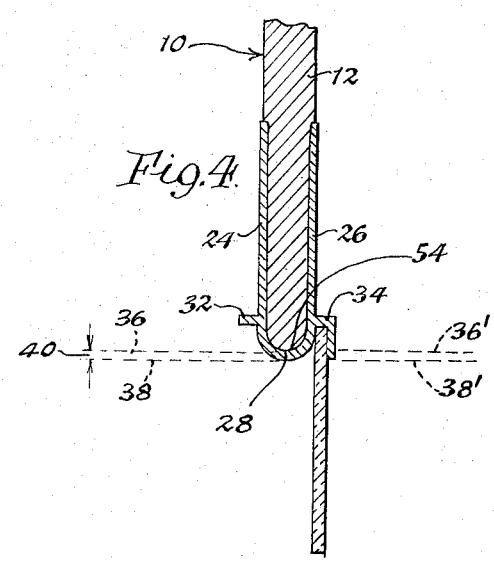
FIG. 4 is a variation of the construction shown in FIG. 2 showing a rounding of the lower part of the clip device.

As more clearly shown in FIGS. 2 and 4, the clip device 22 comprises opposed arms 24 and 26 which are joined together at their lower ends by the bight portion 28. The bight portion 28 may be either a rounded or a substantially horizontal connecting member. The arms 24 and 26 at their upper free end portions are spaced apart slightly less than the normal thickness of the body 12 of the sun visor, over which they are placed from below and which they frictionally engage to hold the shield in position. The arms 24 and 26 and the bight portion 28 may provide resiliency as desired for spring tension.

Figure 3:
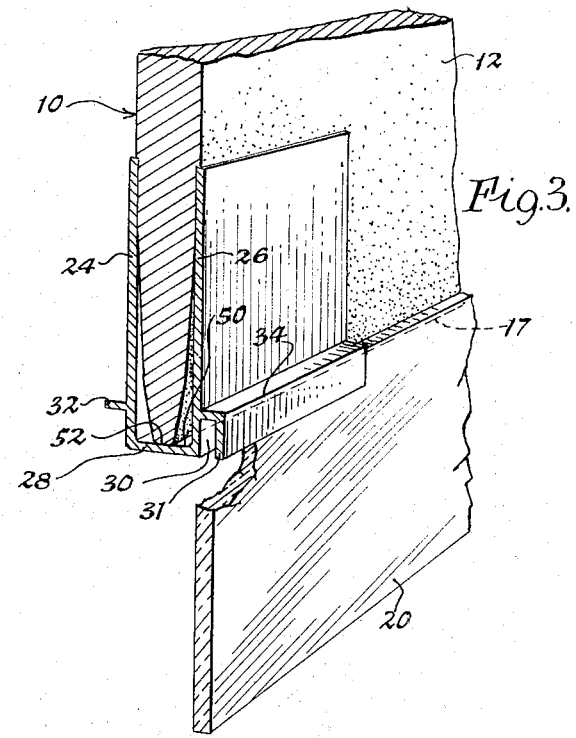
FIG. 3 is an enlarged perspective view of the clip device as shown in FIG. 2.

In FIGS. 2 and 3 the bight portion 28 presents an upwardly facing seating surface 50 which engages the lowe edge of the sun visor as indicated at 52. This engagement is maintained by the gripping of the visor by the arms 24 and 26 at their upper free end portions thereby to stabilize the clip with respect to the sun visor.

In FIG. 4 the bight portion 28 conforms generally with the lower edge portion of the sun visor, which it receives, thereby to provide a stabilizing seating surface 54 which stabilizes the clip device with relation to the sun visor.

Best shown in FIG. 3 is the external wall surface 30 adjacent the juncture of the bight portion 28 with the arm 26. The wall surface 30 overlaps the lower edge portion of the visor 10, as shown, and extends transversely across the width of the clip, and preferably is located on both the bight portion 28 and the lower extremity of the arm 26. Also shown in FIG. 3 is a wall 31 which is appended to the exterior side of the arm 26 and which extends downwardly in opposition to and parallel with the wall surface 30 in conjunction with which it forms a downwardly facing channel which receives the upper marginal edge portion of the body 20 of the shield and holds it in overlapping relation to the lower edge portion of the sun visor so that such main body portion of the glare shield extends below the bottom edge 17 of the sun visor as a downward extension of the visor. The wall surface 30 preferably is generally parallel with the upper free end portions of the arms 24 and 26 which grip the visor so that the body 20 of the glare shield is held in a plane generally parallel to that of the sun visor. The depth of the channel preferably is not extensive, being only as much as is required to securely hold the body of the shield. The greater the depth of the channel the greater the leverage of the wall 31 and the weaker its grip on the body of the shield at the opening of the channel. Because of the relatively short length desired for the wall 31 as compared to the much greater length required of the arm 26 for effectively gripping the sun visor, it is important that the wall 31 append from the side of the arm 26 near its lower extremity rather than being appended from its upper extremity or folded back from its upper end.

It is desirable that the channel opening be at substantially the same downward level as the bight 28, as shown in FIGS. 2, 3 and 4. This provides maximum stability to the body 20 of the glare shield. Were the channel opening raised so as to be located on the side of the arm 26 above its lower extremity, the body 20 of the glare shield would tend to flap against the sun visor. Further, were the channel opening raised to such upward location, the width or downward extent of the body 20 of the glare shield would have to be correspondingly increased to maintain the same width or downward extent of the body 20 below the bottom edge 17 of the sun visor. This increased width would place added strain on the wall 31 in holding the body 20, particularly if pushed against or bumped. The increased width would also tend to place the side of the clip beyond the reach of the fingers of the operator while attaching the clip to or detaching it from the sun visor, resulting in a gripping of the body of the shield which would be apt to leave finger prints on such body below the bottom edge of the sun visor, thereby impairing visibility. The ability of the operator to grasp the clip is a limiting factor in determining the width of the shield. Best results are obtained, it has been found, with the upper marginal edge of the shield overlapping the bead or lower edge portion of the sun visor. This requires, when using a shield with a straight upper marginal edge as is preferable, that the channel opening be at the extreme lower end of the clip, i.e., at substantially the same downward level as the bight.

On the lower outer surface of each of the arms 24 and 26 are raised ridges 32 and 34, respectively, extending transversely across the width of the arm, as shown in FIGS. 2, 3 and 4. Such raised ridges provide a means for the operator to grip the shield while attaching it to or removing it from the main body 12 of the sun visor. In FIGS. 2, 3 and 4 the wall 30 also serves as the raised ridge 34.

In attaching the glare shield to the sun visor, the clip device is placed over the sun visor so as to straddle it from below with the bight portion 28 pressing firmly against the lower edge 17 of the visor, as shown in FIGS. 2, 3 and 4. The parallel dotted lines 36—36' and 38—38' in FIGS. 2 and 4 represent, respectively, the level of the lower edge 17 of the sun visor and the level of the bottom of the bight 28. The distance 40 between the parallel dotted lines 36—36' and 38—38' represents the extent of the downward protrusion of the clip device 22 below the lower edge 17 of the sun visor. The construction of the present invention, by permitting the clip device to be made separately from and consequently of stronger material than, the body of the shield makes it possible to reduce the downward protrusion 40 so as to be minimal, in which condition the images of the downwardly protruding portion of the clip device 22, as seen by each eye of the operator, are minimal and not objectionably distracting.

I claim:

1. In combination with a vehicle sun visor having an opaque body disposed substantially vertically so as to present a transversely extending substantially horizontal lower edge portion;

a glare shield comprising a body of transparent glare reducing material having an upper marginal edge portion for disposition in overlapping relation to the lower edge portion of said visor so as to form a downward extension of the sun visor, and a clip device for holding and maintaining said glare shield stabilized in such overlapping position with respect to the sun visor, said clip device comprising (1) a pair of opposed arms stradling said body of the sun visor and having upper free end portions spaced apart to engage and frictionally grip the body of said sun visor therebetween, (2) a bight portion joining the lower ends of said arms to effect the aforesaid gripping action, said bight portion presenting an upwardly facing seating surface engaging against the lower edge of said sun visor along the width of the clip device and being maintained in such engagement with such lower edge by said gripping action of the arms so as to stabilize the clip device with respect to said sun visor, (3) an external wall surface adjacent the juncture of said bight portion with one of said arms, such wall surface overlapping said lower edge portion of said sun visor and extending transversely across the clip device substantially parallel with said sun visor, and (4) a further wall appended to the exterior side of such one arm near its lower extremity and extending downwardly in opposition to said wall surface and parallel thereto defining a downwardly facing transversely extending channel therewith receiving said upper marginal edge of the glare shield and maintaining it in the aforesaid position with respect to said sun visor.

2. In combination with a vehicle sun visor having an opaque body disposed substantially vertically so as to present a transversely extending substantially horizontal lower edge portion;

a glare shield comprising a body of transparent glare reducing material having an upper marginal edge portion for disposition in overlapping relation to the lower edge portion of said sun visor so as to form a downward extension of the sun visor, and a clip device for holding and maintaining said glare shield stabilized in such overlapping position with respect to the sun visor, said clip device comprising (1) a pair of opposed arms stradling said body of the sun visor and having upper free end portions spaced apart to engage and frictionally grip the body of said sun visor therebetween, (2) a bight portion joining the lower ends of said arms to effect the aforesaid gripping action, said bight portion presenting an upwardly facing seating surface engaging against the lower edge of said sun visor along the width of the clip device and being maintained in such engagement with such lower edge by said gripping action of the arms so as to stabilize the clip device with respect to said sun visor, (3) an external wall surface adjacent the juncture of said bight portion with one of said arms, such wall surface overlapping said lower edge portion of said sun visor and extending transversely across the clip device substantially parallel with said sun visor, and (4) a further wall appended to the exterior side of such one arm and extending downwardly in opposition to said wall surface and parallel thereto defining a downwardly facing transversely extending channel therewith receiving said upper marginal edge of the glare sheild and maintaining it in the aforesaid position with respect to said sun visor, said wall surface and said further wall extending downward to the extent that the downwardly facing transversely extending channel formed thereby has its opening at substantially the same downward level as the bight.

* * * * *